(12) United States Patent
Fujiwara

(10) Patent No.: US 12,196,971 B2
(45) Date of Patent: Jan. 14, 2025

(54) IMAGE PROCESSING DEVICE, GLASSES-TYPE INFORMATION DISPLAY DEVICE, IMAGE PROCESSING METHOD, AND IMAGE PROCESSING PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/360,363

(22) Filed: Jul. 27, 2023

(65) Prior Publication Data
US 2024/0036329 A1 Feb. 1, 2024

(30) Foreign Application Priority Data
Jul. 29, 2022 (JP) ................. 2022-122239

(51) Int. Cl.
G02B 27/01 (2006.01)
(52) U.S. Cl.
CPC ................. G02B 27/0172 (2013.01)
(58) Field of Classification Search
CPC ............ G02B 27/0172; G06T 2210/62; G06T 11/001
See application file for complete search history.

(56) References Cited

U.S. PATENT DOCUMENTS

| | | | | |
|---|---|---|---|---|
| 11,449,189 | B1* | 9/2022 | Bond | G06F 3/0482 |
| 2017/0270715 | A1* | 9/2017 | Lindsay | G06T 7/60 |
| 2018/0249086 | A1* | 8/2018 | Ozawa | G02B 27/0172 |
| 2019/0304400 | A1* | 10/2019 | Hong | G09G 5/14 |
| 2020/0017026 | A1* | 1/2020 | Kumar | B60R 1/27 |
| 2020/0285884 | A1* | 9/2020 | Murata | G06V 20/59 |
| 2021/0166661 | A1* | 6/2021 | Wakabayashi | G02B 27/0172 |
| 2022/0197377 | A1* | 6/2022 | Kim | G06V 40/18 |
| 2022/0214546 | A1* | 7/2022 | Marconcini | G02B 27/0179 |
| 2023/0298279 | A1* | 9/2023 | Avisar | G06F 3/0346 345/419 |
| 2023/0305793 | A1* | 9/2023 | Takahashi | H04N 23/635 |

FOREIGN PATENT DOCUMENTS

| | | |
|---|---|---|
| CN | 115248501 A | 10/2022 |
| EP | 4 235 393 A1 | 8/2023 |
| JP | WO2019/123770 A1 | 3/2021 |

OTHER PUBLICATIONS

Extended European Search Report for European Application No. 23188500.5, dated Dec. 11, 2023.

* cited by examiner

*Primary Examiner* — Benyam Ketema
(74) *Attorney, Agent, or Firm* — Birch, Stewart, Kolasch & Birch, LLP

(57) ABSTRACT

An image processing device includes at least one processor, in which in a case in which, for at least one image of a real image visually recognized by a user through a transmission unit of a glasses-type information display device or a projected image projected onto the transmission unit and visually recognized by the user, a visibility change unit that changes visibility by the user changes visibility of the real image, the processor generates an image simulating the real image after the change in visibility from a captured image obtained by imaging a real world with a camera based on at least one of information indicating the change in visibility, model information on the glasses-type information display device, or model information on the camera.

11 Claims, 8 Drawing Sheets

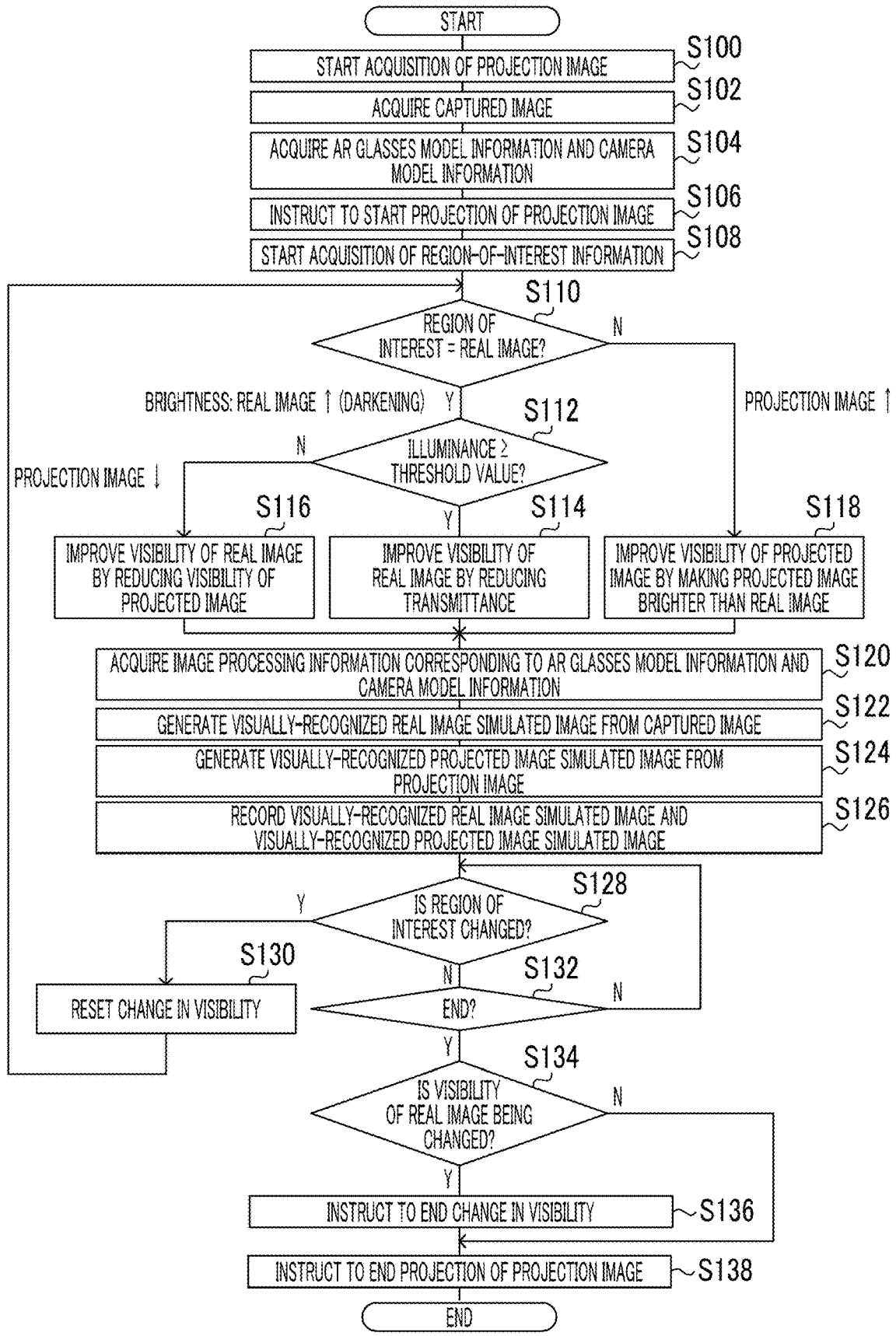

IMAGE PROCESSING DEVICE, GLASSES-TYPE INFORMATION DISPLAY DEVICE, IMAGE PROCESSING METHOD, AND IMAGE PROCESSING PROGRAM

CROSS-REFERENCE TO RELATED APPLICATIONS

This application is based on and claims priority under 35 USC 119 from Japanese Patent Application No. 2022-122239, filed Jul. 29, 2022, the disclosure of which is incorporated herein by reference in their entirety.

TECHNICAL FIELD

The present disclosure relates to an image processing device, a glasses-type information display device, an image processing method, and an image processing program.

RELATED ART

A glasses-type information display device, such as an augmented reality (AR) device that displays a state in which an image is superimposed on a real world, is known in the related art as a display device that displays a three-dimensional video.

In a brain of a user who uses the glasses-type information display device, a real image in which the real world is visually recognized and a projected image in which a projection image is visually recognized are combined, so that the user can visually recognize a state where the projected image overlaps the real image.

A technique for changing the visibility of the real image and the projected image in the glasses-type information display device is known. For example, JP2019-123770A1 discloses a technique for changing a transparency of a virtual object in a display of an optically transmissive head-mounted display in which a virtual object is superimposed and displayed in a real space based on a detection result in which a visual line of the user is detected.

SUMMARY

By the way, in the glasses-type information display device, the visually-recognized image, which is actually visually recognized by the user, may be different from the captured image obtained by imaging the real world which is visually recognized by the user in some cases.

The present disclosure has been made in view of the above circumstances, and an object of the present disclosure is to provide an image processing device, an image processing method, and an image processing program capable of obtaining an image simulating an image which is visually recognized by the user.

In order to achieve the above object, an image processing device of a first aspect of the present disclosure comprises at least one processor, in which in a case in which, for at least one image of a real image visually recognized by a user through a transmission unit of a glasses-type information display device or a projected image projected onto the transmission unit and visually recognized by the user, a visibility change unit that changes visibility by the user changes visibility of the real image, the processor generates an image simulating the real image after the change in visibility from a captured image obtained by imaging a real world with a camera based on at least one of information indicating the change in visibility, model information on the glasses-type information display device, or model information on the camera.

According to an image processing device of a second aspect of the present disclosure, in the image processing device of the first aspect, the processor performs a control to record the image simulating the real image after the change in visibility.

According to an image processing device of a third aspect of the present disclosure, in the image processing device of the first aspect, in a case in which the visibility change unit changes visibility of the projected image, the processor generates an image simulating the projected image after the change in visibility from a projection image projected onto the transmission unit based on the information indicating the change in visibility and the model information on the glasses-type information display device, and performs a control to record the image simulating the projected image after the change in visibility.

According to an image processing device of a fourth aspect of the present disclosure, in the image processing device of the third aspect, the model information on the glasses-type information display device is information corresponding to a type of the transmission unit.

According to an image processing device of a fifth aspect of the present disclosure, in the image processing device of the fourth aspect, the transmission unit includes a light guide plate that propagates light representing the projection image and emits the light in a direction of a user's eye, and the model information on the glasses-type information display device is information corresponding to a type of the light guide plate.

In order to achieve the above object, a glasses-type information display device of a sixth aspect of the present disclosure comprises a transmission unit, a visibility change unit, and the image processing device of the present disclosure.

In order to achieve the above object, an image processing method of a seventh aspect of the present disclosure comprises generating, in a case in which, for at least one image of a real image visually recognized by a user through a transmission unit of a glasses-type information display device or a projected image projected onto the transmission unit and visually recognized by the user, a visibility change unit that changes visibility by the user changes visibility of the real image, an image simulating the real image after the change in visibility from a captured image obtained by imaging a real world with a camera based on at least one of information indicating the change in visibility, model information on the glasses-type information display device, or model information on the camera.

In order to achieve the above object, an image processing program of an eighth aspect of the present disclosure is a program for causing a processor to execute a process comprising generating, in a case in which, for at least one image of a real image visually recognized by a user through a transmission unit of a glasses-type information display device or a projected image projected onto the transmission unit and visually recognized by the user, a visibility change unit that changes visibility by the user changes visibility of the real image, an image simulating the real image after the change in visibility from a captured image obtained by imaging a real world with a camera based on at least one of information indicating the change in visibility, model information on the glasses-type information display device, or model information on the camera.

According to the present disclosure, it is possible to obtain an image simulating an image which is visually recognized by the user.

BRIEF DESCRIPTION O/F THE DRAWINGS

FIG. 8 is a flowchart showing an example of image processing executed by the smartphone according to the embodiment.

DETAILED DESCRIPTION

Hereinafter, examples of an embodiment for implementing the technology of the present disclosure will be described in detail with reference to the drawings.

Figure 1:
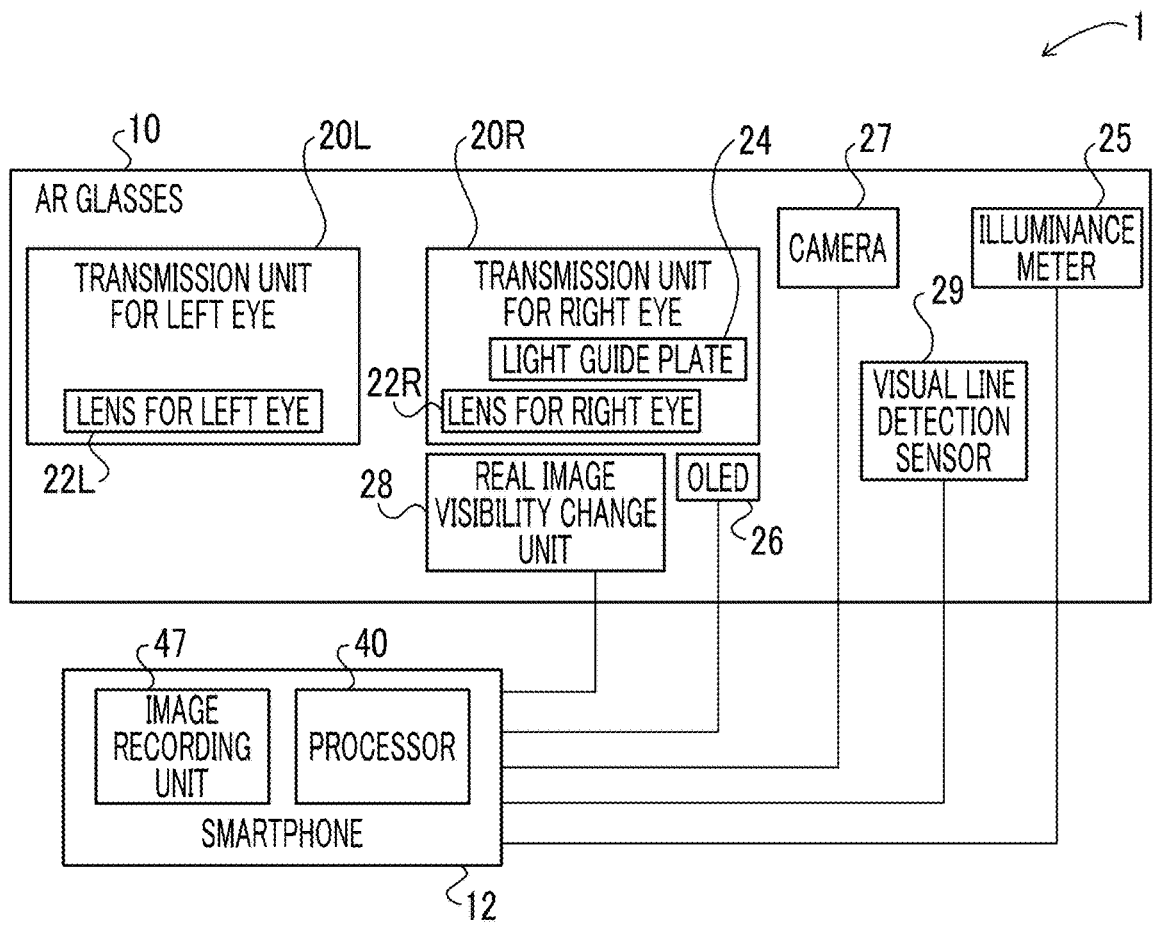
FIG. 1 is a configuration diagram showing an example of a configuration of a glasses-type information display device according to an embodiment.

The configuration of a glasses-type information display device 1 according to the present embodiment will be described with reference to FIG. 1. As shown in FIG. 1, the glasses-type information display device 1 according to the present embodiment comprises augmented reality (AR) glasses 10 and a smartphone 12.

Figure 2:
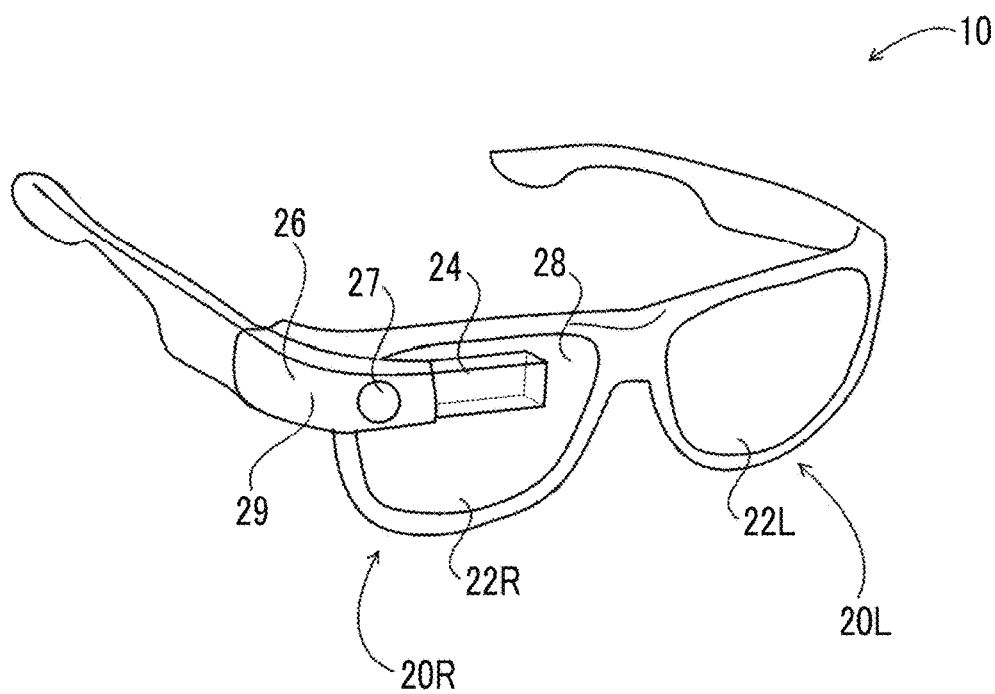
FIG. 2 is a perspective view showing an example of AR glasses according to the embodiment.

The AR glasses 10 are a device that allows a user to visually recognize a projection image, which is projected from an organic light emitting diode (OLED) 26, in a state in which the projection image is superimposed on a real image. FIG. 2 is a perspective view of an example of the AR glasses 10 of the present embodiment. As shown in FIGS. 1 and 2, the AR glasses 10 comprise a pair of a transmission unit 20L for a left eye and a transmission unit 20R for a right eye, an illuminance meter 25, an OLED 26, a camera 27, a real image visibility change unit 28, and visual line detection sensor 29. The transmission unit 20R for a right eye of the present embodiment is an example of the transmission unit of the present disclosure.

The OLED 26 projects an image (projection image), which represents information, onto the transmission unit 20R for a right eye in order to insert information into the visual field of a real image, which is visually recognized by the user through the transmission unit 20R for a right eye, in a superimposed manner.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye, is guided to the right eye of the user, and is visually recognized as a projected image with the right eye. In addition, the user visually recognizes the real world, which is shown through the lens 22R for a right eye, as a real image with the right eye.

For this reason, while the projection image is projected from the OLED 26, the visually-recognized image visually recognized with the right eye of the user is in a state in which the projected image according to the projection image projected onto the light guide plate 24 is superimposed on the real image representing the real world shown through the lens 22R for a right eye. In addition, while the projection image is not projected from the OLED 26, the visually-recognized image visually recognized by the user is the real image that represents the real world shown through the lens 22R for a right eye and the light guide plate 24.

Meanwhile, the transmission unit 20L for a left eye includes a lens 22L for a left eye. The user visually recognizes the real world, which is shown through the lens 22L for a left eye, with the left eye.

The real image visibility change unit 28 changes the visibility of the real image visually recognized by the user shown through the lens 22R for a right eye in a case in which the OLED 26 projects the projection image onto the light guide plate 24. As an example, the real image visibility change unit 28 of the present embodiment changes the visibility of the entire lens 22R for a right eye by changing optical characteristics of the transmission unit 20R for a right eye. In addition, as an example in which the real image visibility change unit 28 of the present embodiment changes the optical characteristics of the transmission unit 20R for a right eye, the real image visibility change unit 28 adjusts a light shielding rate of the transmission unit 20R for a right eye, more specifically, the lens 22R for a right eye stepwise to reduce the visibility of the real image that is visually recognized with the right eye of the user stepwise. Examples of such a real image visibility change unit 28 include a liquid crystal shutter, electrochromism, a variable neutral density (ND) filter, and the like. The real image visibility change unit 28 of the present embodiment is an example of a visibility change unit of the present disclosure.

The camera 27 is a camera that images the real world observed by the user. Examples of the camera 27 include a digital camera such as a complementary metal oxide semiconductor (CMOS) camera. In the present embodiment, the camera 27 images the captured image equivalent to the real image visually recognized by the user, so that the camera 27 can image a color image. In addition, the camera 27 of the present embodiment is a camera using a so-called fisheye lens or a wide-angle lens, which can set a region equivalent to a range of the user's field of view as an imaging range. As described above, in the present embodiment, the imaging range of the camera 27 is set to be a region equivalent to the range of the user's field of view, but is not limited to this embodiment and the region may be wider or narrower than the range of the user's field of view. In order to provide the user with at least visual recognition of the real world, it is preferable that the imaging range of the camera 27 is equal to or greater than the range of the user's field of view. The image data of the captured image which is captured by the camera 27 is output to the smartphone 12. In the present embodiment, the "captured image" refers to an image captured by the camera 27.

The visual line detection sensor 29 is a sensor that detects a visual line of the user. As the visual line detection sensor 29, a known sensor can be applied, and examples thereof include a sensor that detects a visual line direction of the user based on a position of an iris or a pupil. As an example, the AR glasses 10 of the present embodiment detects the visual line of the right eye of the user. A detection result of the visual line detection sensor 29 is output to the smartphone 12.

The illuminance meter 25 is a sensor that detects illuminance as a brightness of the ambient light and as the brightness of the real world visually recognized by the user. The illuminance detected by the illuminance meter 25 is output to the smartphone 12.

On the other hand, the smartphone 12 comprises a processor 40 and an image recording unit 47. The processor 40 of the present embodiment controls the OLED 26 to project the projection image onto the light guide plate 24 from the OLED 26. In addition, the processor 40 controls the visibility of the real image and the visibility of the projected image. The smartphone 12 of the present embodiment is an example of an image processing device of the present disclosure.

The image recording unit 47 records captured images captured by the camera 27, projection images, and the like.

Figure 3:
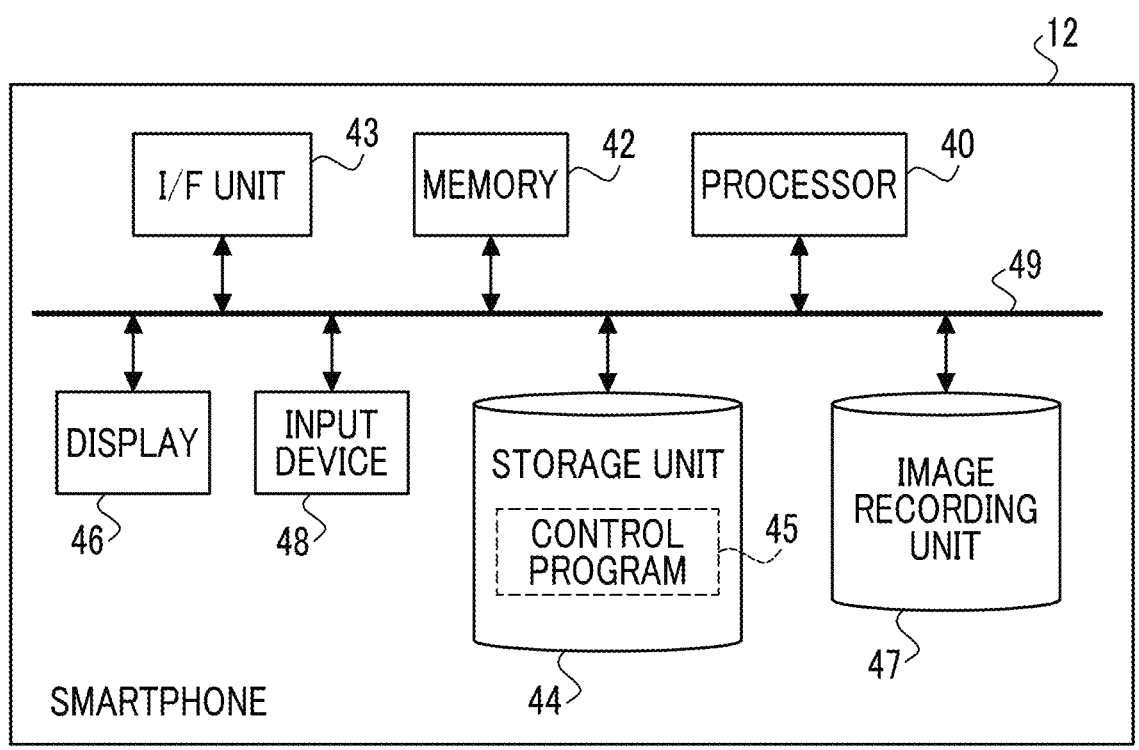
FIG. 3 is a block diagram showing an example of a configuration of a smartphone according to the embodiment.

FIG. 3 is a block diagram showing an example of a configuration of the smartphone 12 that is related to functions related to the control of the visibility of the real image and the control of the visibility of the projection image. As shown in FIG. 3, the smartphone 12 comprises a processor 40, a memory 42, an interface (I/F) unit 43, a storage unit 44, a display 46, an image recording unit 47, and an input device 48. The processor 40, the memory 42, the I/F unit 43, the storage unit 44, the display 46, the image recording unit 47, and the input device 48 are connected to each other via a bus 49, such as a system bus or a control bus, such that various types of information can be given and received therebetween.

The processor 40 reads out various programs, which include an image processing program 45 stored in the storage unit 44, to the memory 42 and performs processing corresponding to the program read out. Accordingly, the processor 40 controls the projection of the projection image that is performed by the OLED 26, and performs a control to cause the real image visibility change unit 28 to reduce visibility. The memory 42 is a work memory that is used in a case in which the processor 40 performs processing.

The image processing program 45, the image data (not shown) of the projection image projected from the OLED 26, various other types of information, and the like are stored in the storage unit 44. Specific examples of the storage unit 44 include a hard disk drive (HDD), a solid state drive (SSD), and the like.

The I/F unit 43 communicates various types of information to each of the OLED 26 and the real image visibility change unit 28 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. In addition, the input device 48 is operated by a user so that various instructions related to the projection of the projection image are input. The input device 48 is not particularly limited, and examples of the input device 48 include a keyboard, a touch pen, a mouse, and the like. A touch panel display in which the display 46 and the input device 48 are integrated with each other is employed in the smartphone 12.

In addition, the function of the smartphone 12 of the present embodiment will be described. The processor 40 of the smartphone 12 of the present embodiment performs a control to change the visibility of at least one image of the real image which is visually recognized by the user shown through the lens 22R for a right eye of the transmission unit 20R for a right eye or the projected image which is projected onto the light guide plate 24 of the transmission unit 20R for a right eye and is visually recognized by the user. In addition, the smartphone 12 has a function of generating an image simulating the real image visually recognized by the user from the captured image and of performing a control to cause the image recording unit 47 to record the image in a case in which the visibility of the real image is changed. In addition, the smartphone 12 generates an image simulating the real image visually recognized by the user from the captured image in a case in which the visibility of the real image is changed, and generates an image simulating the projected image visually recognized by the user from the projection image in a case in which the visibility of the projected image is changed, and performs a control to cause the image recording unit 47 to record each of the images. In the present embodiment, the image simulating the real image visually recognized by the user is referred to as a visually-recognized real image simulated image. The visually-recognized real image simulated image of the present embodiment is an example of an image simulating the real image after the change in visibility of the present disclosure. In addition, in the present embodiment, an image simulating the projected image visually recognized by the user is referred to as a visually-recognized projected image simulated image, and the visually-recognized projected image simulated image of the present embodiment is an example of an image simulating the projected image after the change in visibility of the present disclosure. Here, changes in the visibility of the real image and the projected image will be described.

Figure 4:
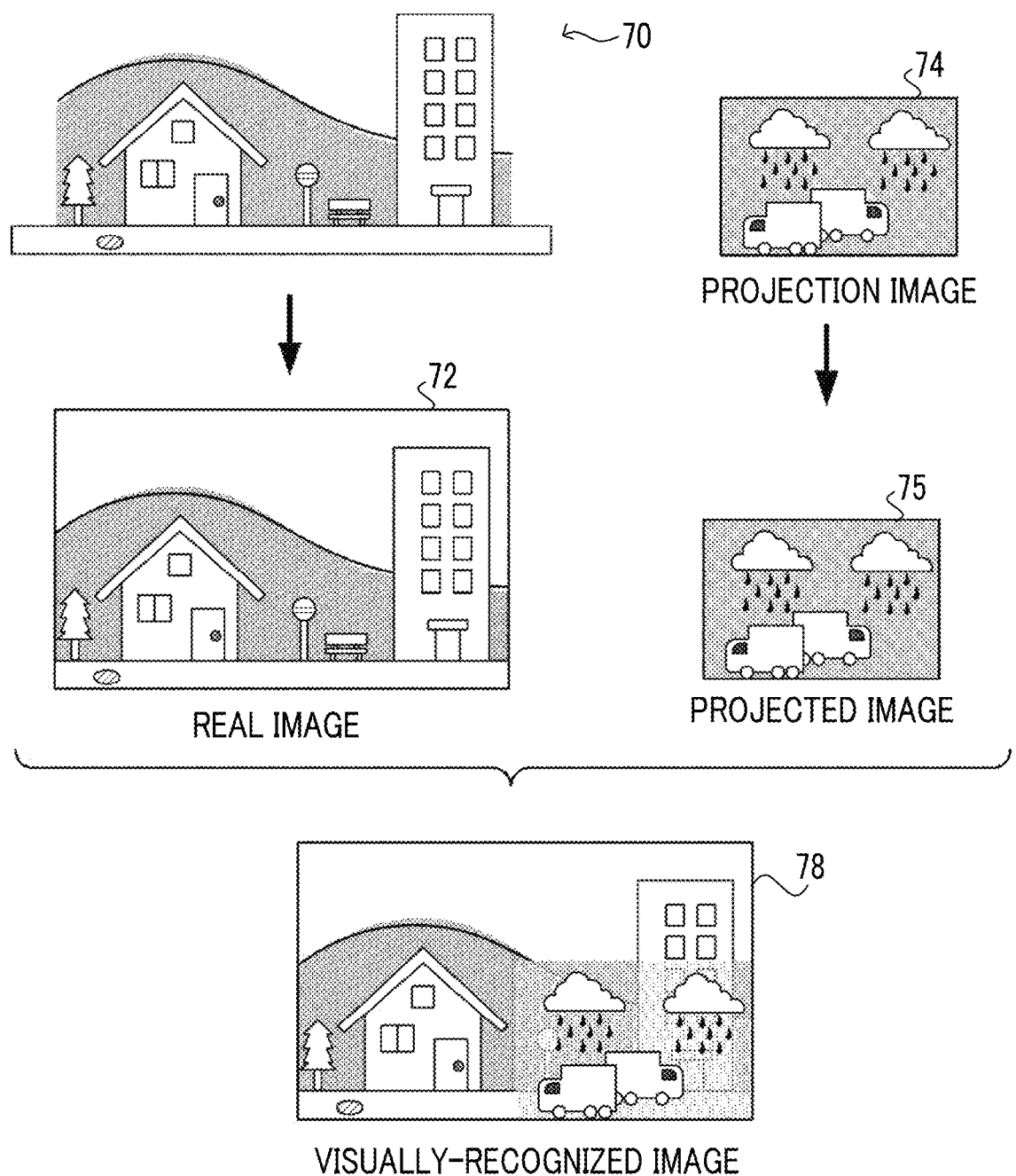
FIG. 4 is a diagram for explaining a visually-recognized image which is visually recognized by a user.

A state in which a user who uses the glasses-type information display device 1 visually recognizes a real world 70 will be described with reference to FIG. 4. As shown in FIG. 4, in a case in which the user visually recognizes the real world 70 in a state in which the projection image is not projected from the OLED 26, the user visually recognizes the real image 72.

In a case in which a projection image 74 is projected onto the light guide plate 24 from the OLED 26 in this state, as shown in FIG. 4, the user visually recognizes a projected image 75 corresponding to the projection image 74. Therefore, a visually-recognized image 78 visually recognized by the user is an image in which the real image 72 and the projected image 75 are superimposed.

Figure 5A:
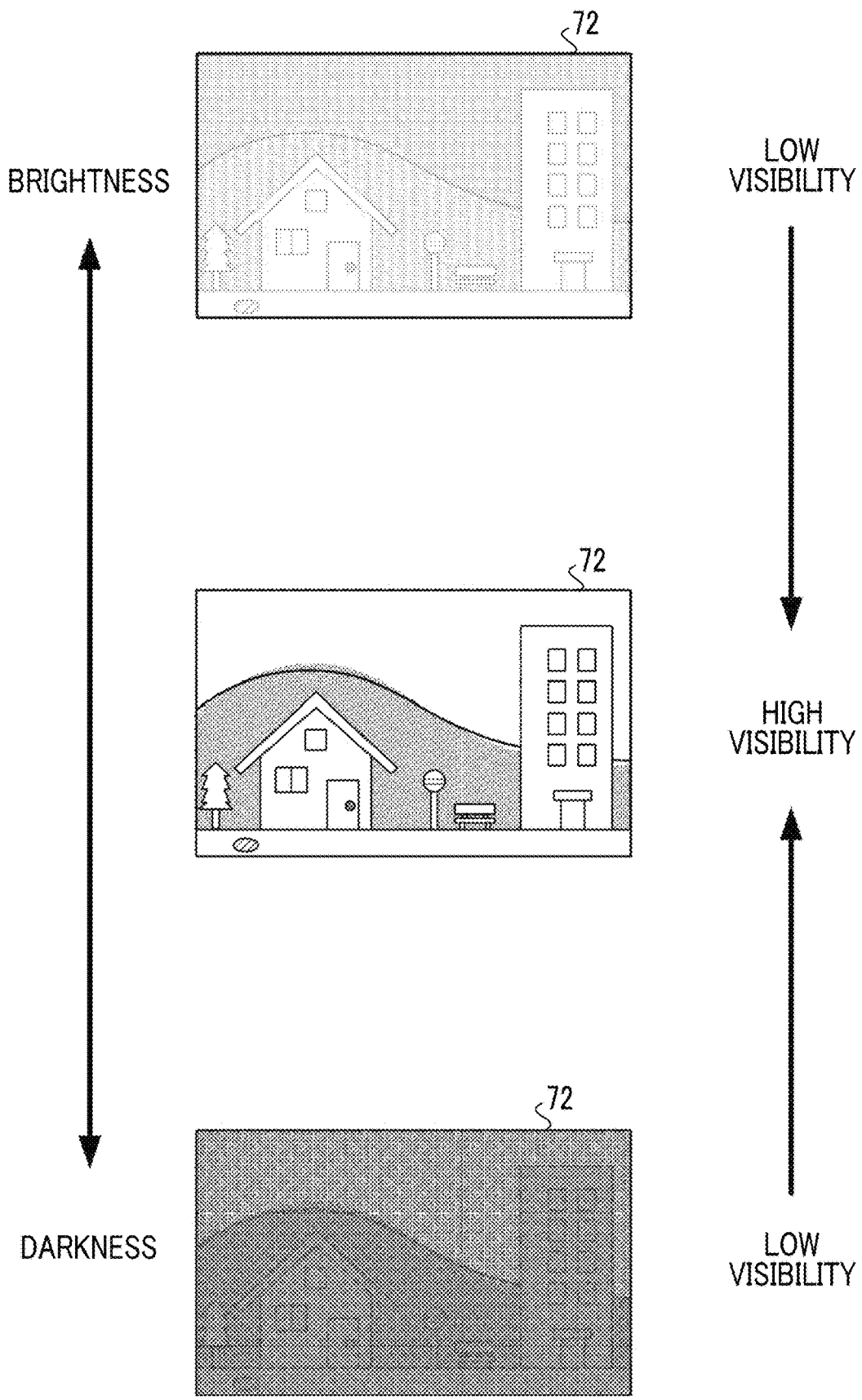
FIG. 5A is a diagram for explaining a change in visibility of a real image.

As for the real image 72, as shown in FIG. 5A, in a case in which the real world 70 is too bright, that is, in a case in which the real world 70 is dazzling, the real image 72 is too bright and the visibility of the real image 72 is reduced. For this reason, in a case in which the real world 70 is too bright, the visibility of the real image 72 can be improved by darkening the real image 72. In the present embodiment, in a case in which the illuminance (hereinafter, simply referred to as the illuminance of the real world 70), which is the detection result of detecting the brightness of the real world 70 by the illuminance meter 25, is equal to or greater than a threshold value, it is determined that the brightness of the real world 70 is too bright, and the visibility of the real image 72 is improved by increasing the light shielding rate of the lens 22R for a right eye by the real image visibility change unit 28.

On the other hand, in a case in which the real world 70 is too dark, the real image 72 is too dark and the visibility of the real image 72 is reduced. For this reason, in a case in which the real world 70 is too dark, the visibility of the real image 72 can be improved by making the real image 72 relatively brighter than the projected image 75. In the present embodiment, in a case in which the illuminance of the real world 70 is less than the threshold value and it is determined that the brightness of the real world 70 is too dark, the brightness of the projected image 75 is reduced to darken the projected image 75 by making a brightness value of the projection image 74 smaller than a predetermined value. Accordingly, the visibility of the real image 72 can be improved by making the real image 72 relatively brighter than the projected image 75.

Figure 5B:
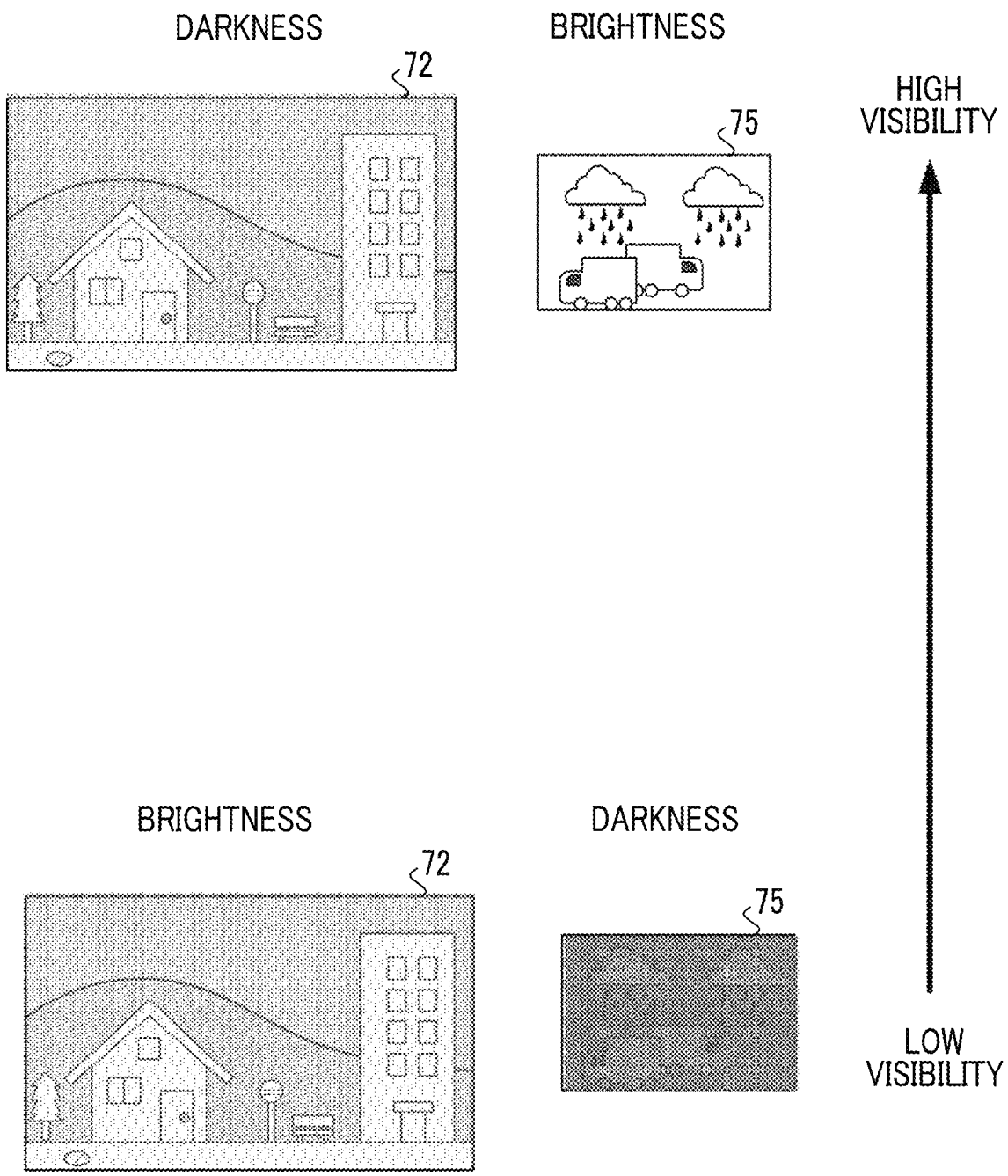
FIG. 5B is a diagram for explaining a change in visibility of a projected image.

On the other hand, as shown in FIG. 5B, the visibility of the projection image 74 can be improved by making the projection image 74 relatively brighter than the real image 72. In the present embodiment, the brightness value of the projection image 74 is made larger than the predetermined value, so that the brightness of the projected image 75 is increased to brighten the projected image 75. Accordingly, the visibility of the projected image 75 can be improved by making the projected image 75 relatively brighter than the real image 72.

In the present embodiment, the processor 40 acquires, based on whether the user visually recognizes the real image 72 or the projection image 74 based on the detection result of the visual line detection sensor 29, one image whose the user visually recognizes among the real image 72 and the projected image 75, as a region of interest. Then, the control is performed such that the visibility of an image that is the region of interest among the real image 72 and the projected image 75 is made relatively higher than the visibility of an image that is not the region of interest.

Figure 6:
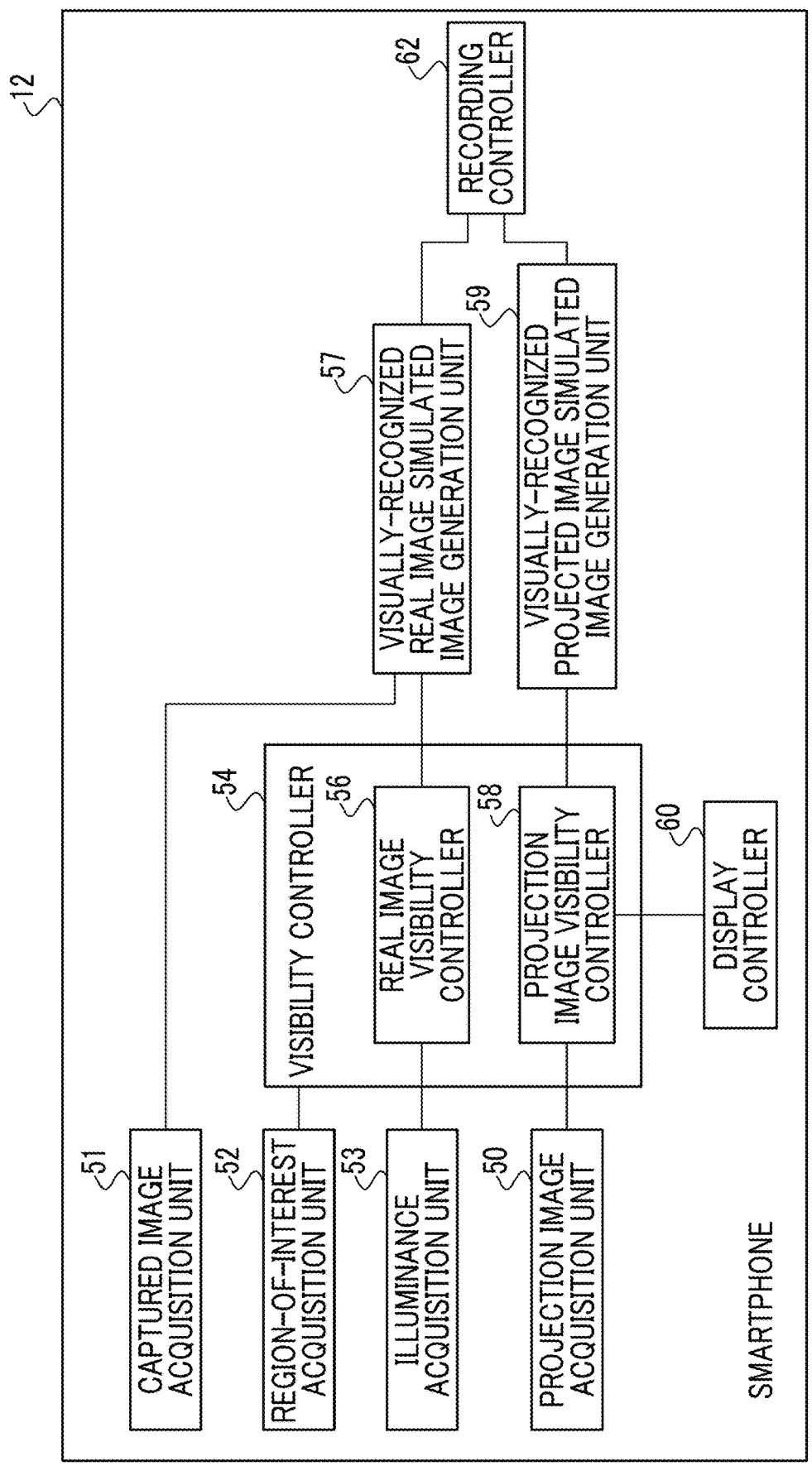
FIG. 6 is a block diagram showing an example of a hardware configuration of the smartphone according to the embodiment.

FIG. 6 is a functional block diagram showing an example of a configuration related to the function of the smartphone 12 of the present embodiment. As shown in FIG. 6, the smartphone 12 comprises a projection image acquisition unit 50, a captured image acquisition unit 51, a region-of-interest acquisition unit 52, an illuminance acquisition unit 53, a visibility controller 54, a visually-recognized real image simulated image generation unit 57, a visually-recognized projected image simulated image generation unit 59, a display controller 60, and a recording controller 62. As an example, in the smartphone 12 of the present embodiment, the processor 40 executes the image processing program 45 stored in the storage unit 44, so that the processor 40 functions as the projection image acquisition unit 50, the captured image acquisition unit 51, the region-of-interest acquisition unit 52, the illuminance acquisition unit 53, the visibility controller 54, the visually-recognized real image simulated image generation unit 57, the visually-recognized projected image simulated image generation unit 59, the display controller 60, and the recording controller 62.

The projection image acquisition unit 50 has a function of acquiring image data of the projection image projected by the OLED 26. In the present embodiment, as an example, since the image data of the projection image is stored in the storage unit 44, the projection image acquisition unit 50 acquires the image data of the projection image from the storage unit 44. Regardless of the present embodiment, image data of the projection image may be acquired from an external device of the smartphone 12 via the O/F unit 43. The projection image acquisition unit 50 outputs the image data of the projection image to the visibility controller 54. Hereinafter, the image data of the projection image is simply referred to as the projection image, and for example, acquiring the image data of the projection image is referred to as acquiring the projection image.

The captured image acquisition unit 51 has a function of acquiring image data of a captured image obtained by imaging the real world 70 with the camera 27. The image data of the captured image acquired by the captured image acquisition unit 51 is output to the visually-recognized real image simulated image generation unit 57. Hereinafter, the image data of the captured image is simply referred to as a captured image, and for example, acquiring the image data of the captured image is referred to as acquiring the captured image.

The region-of-interest acquisition unit 52 acquires the region of interest based on the detection result of the visual line detection sensor 29. Specifically, the region-of-interest acquisition unit 52 acquires the real image 72 as the region of interest in a case in which the detection result of the visual line detection sensor 29 is a detection result in which the visual line is directed to the real image 72. On the other hand, the region-of-interest acquisition unit 52 acquires the projected image 75 as the region of interest in a case in which the detection result of the visual line detection sensor 29 is a detection result in which the visual line is directed to the projected image 75. The region-of-interest acquisition unit 52 outputs information indicating whether the region of interest is the real image 72 or the projected image to the visibility controller 54.

The illuminance acquisition unit 53 has a function of acquiring the illuminance detected by the illuminance meter 25. That is, the illuminance acquisition unit 53 of the present embodiment has a function of acquiring illuminance representing the brightness of the real world 70 as described above. The illuminance acquisition unit 53 outputs information indicating the acquired illuminance to the visibility controller 54.

The visibility controller 54 includes a real image visibility controller 56 and a projection image visibility controller 58. The visibility controller 54 has a function of performing a control to change the visibility based on the relationship between at least one of the real image 72 or the projected image 75 and the region of interest.

In a case in which the region of interest is the real image 72, the visibility controller 54 performs a control to make the visibility of the real image 72 relatively higher than the visibility of the projected image 75. In a case of improving the visibility of the real image 72 and in a case in which the illuminance acquired by the illuminance acquisition unit 53 is equal to or greater than the threshold value, the real image visibility controller 56 performs a control to improve the visibility of the real image 72 by the real image visibility change unit 28. The real image visibility controller 56 of the present embodiment instructs the real image visibility change unit 28 such that the light shielding rate of the lens 22R for a right eye is a light shielding rate determined by the visibility controller 54. The real image visibility change unit 28 improves the visibility of the real image 72 visually recognized by the user by setting a light shielding rate to the instructed light shielding rate in response to the instruction output from the smartphone 12. The real image visibility controller 56 outputs information indicating that the visibility of the real image has been improved to the visually-recognized real image simulated image generation unit 57.

In addition, in a case of improving the visibility of the real image 72 and in a case in which the illuminance acquired by the illuminance acquisition unit 53 is less than the threshold value, the projection image visibility controller 58 performs a control to reduce the visibility of the projected image 75 by reducing the brightness value of the projection image 74 to make it darker. The projection image visibility controller 58 of the present embodiment improves the visibility of the real image 72 relatively by reducing the visibility of the projected image 75. The projection image visibility controller 58 outputs the projection image 74 from which the brightness value is reduced to the visually-recognized projected image simulated image generation unit 59 and the display controller 60.

On the other hand, in a case in which the region of interest is the projected image 75, the visibility controller 54 performs a control to make the visibility of the projected image 75 relatively higher than the visibility of the real image 72. In a case of improving the visibility of the projected image 75, the projection image visibility controller 58 performs a control to improve the visibility of the projected image 75 by increasing the brightness value of the projection image 74 to make it brighter. The projection image visibility controller 58 outputs the projection image 74 from which the brightness value is increased to the visually-recognized projected image simulated image generation unit 59 and the display controller 60.

That is, in a case in which the visibility of the projected image 75 is not changed, the projection image visibility controller 58 outputs a projection image 74, which is equivalent to the projection image 74 acquired by the projection image acquisition unit 50, to the visually-recognized projected image simulated image generation unit 59 and the display controller 60. On the other hand, in a case in which the visibility of the projected image 75 is changed, the projection image visibility controller 58 outputs the projection image 74 in which the brightness value is increased or reduced by the projection image visibility controller 58 to the visually-recognized projected image simulated image generation unit 59 and the display controller 60.

The display controller 60 has a function of controlling the OLED 26 to project the projection image.

Figure 7A:
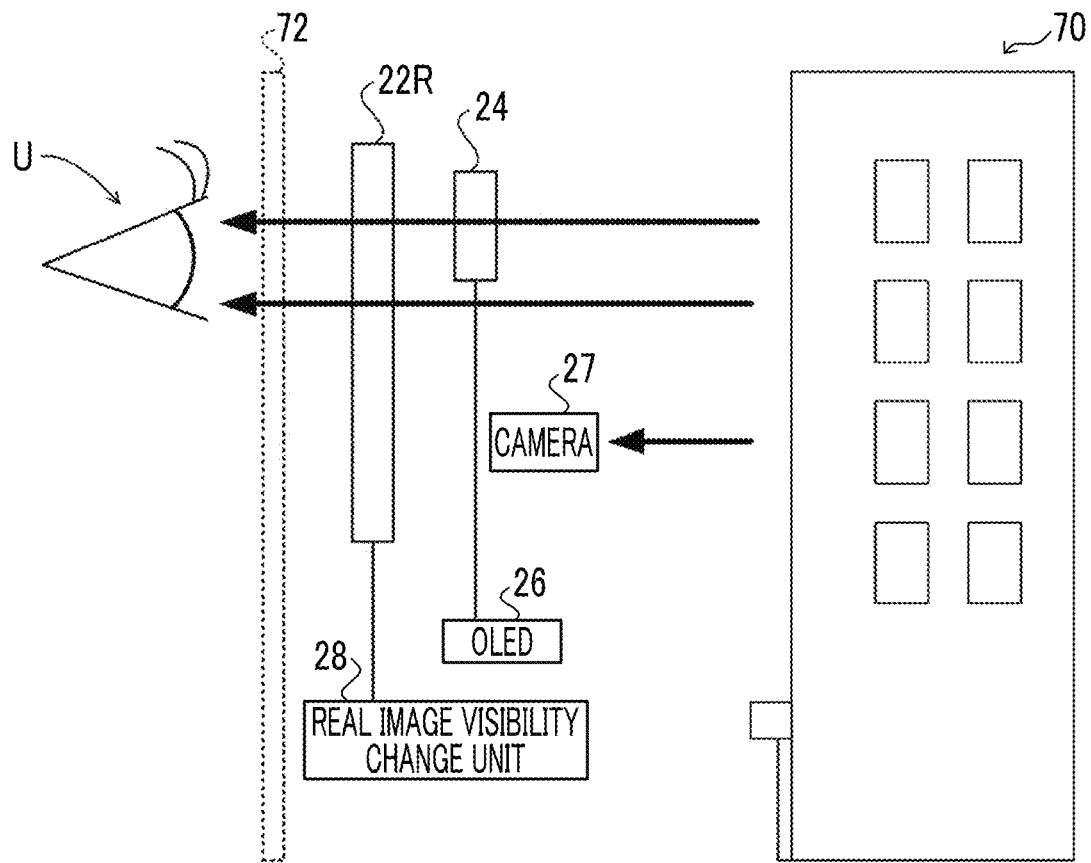
FIG. 7A is a diagram for explaining a real image which is visually recognized by the user.

The visually-recognized real image simulated image generation unit 57 has a function of generating a visually-recognized real image simulated image obtained by simulating the real image 72 visually recognized by the user from the captured image. As shown in FIG. 7A, a user U visually recognizes the real world 70 as a real image 72 through the lens 22R for a right eye and the light guide plate 24. For this reason, the real image 72 visually recognized by the user U is an image affected by the lens 22R for a right eye and the light guide plate 24. For example, the real image 72 is an image with a tint corresponding to the lens 22R for a right eye and the light guide plate 24. On the other hand, the camera 27 images the real world 70 without using the lens 22R for a right eye and the light guide plate 24, and obtains a captured image. For this reason, the captured image is an image affected by the camera 27. For example, the captured image is an image with a tint corresponding to the camera 27. Therefore, the visually-recognized real image simulated image generation unit 57 considers the effects of the lens 22R for a right eye, the light guide plate 24, and the camera 27, and generates the visually-recognized real image simulated image simulating the real image 72 visually recognized by the user U from the captured image obtained by the camera 27. As an example, the visually-recognized real image simulated image generation unit 57 of the present embodiment uses, based on a three-dimensional look up table (LUT) that corrects a tint of the captured image to a reference color for each model of the camera, the three-dimensional LUT corresponding to the model of the camera 27, performs image processing for gradation transformation of each RGB color, and corrects the tint of the captured image to the reference color. Further, the visually-recognized real image simulated image generation unit 57 uses, based on a three-dimensional LUT that corrects the tint of the real image 72 for each model of the AR glasses, the three-dimensional LUT corresponding to the model of the AR glasses 10, performs image processing for gradation transformation of each RGB color, and further corrects the tint of the captured image which is corrected to the reference color to generate a visually-recognized real image simulated image. For the correction of the tint of an image using the three-dimensional LUT, the technique described in JP2001-312720A can be applied. The visually-recognized real image simulated image generation unit 57 outputs the generated visually-recognized real image simulated image to the recording controller 62.

Figure 7B:
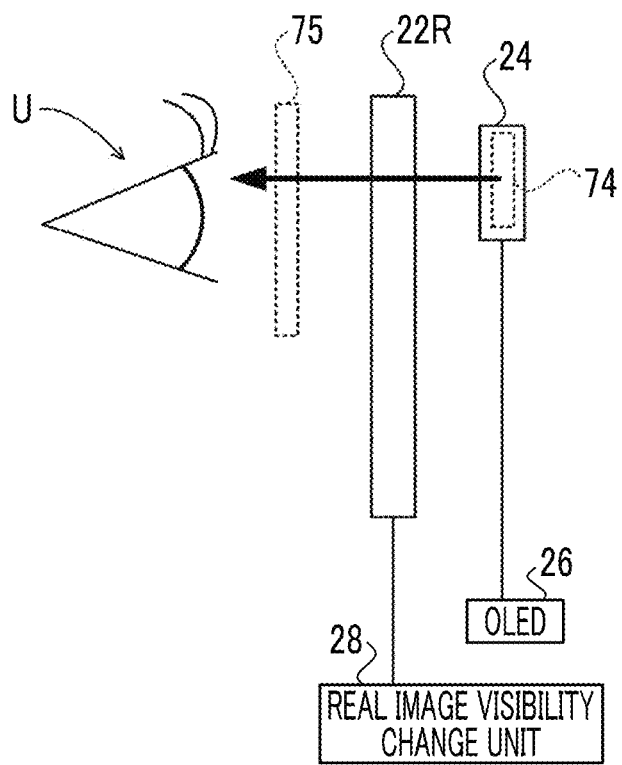
FIG. 7B is a diagram for explaining a projected image which is visually recognized by the user.

The visually-recognized projected image simulated image generation unit 59 has a function of generating an image obtained by simulating the projected image 75 visually recognized by the user from the projection image 74. As shown in FIG. 7B, the user U visually recognizes the projection image 74 projected onto the light guide plate 24 through the lens 22R for a right eye as the projected image 75. For this reason, the projected image 75 visually recognized by the user U is an image affected by the lens 22R for a right eye and the light guide plate 24. For example, the real image 72 is an image with a tint corresponding to the lens 22R for a right eye and the light guide plate 24.

Therefore, the visually-recognized projected image simulated image generation unit 59 considers the effects of the lens 22R for a right eye, the light guide plate 24, and the camera 27, and generates a visually-recognized projected image simulated image simulating the projected image 75 visually recognized by the user U from the projection image 74 output from the projection image visibility controller 58. As an example, the visually-recognized projected image simulated image generation unit 59 of the present embodiment uses, based on a three-dimensional LUT that corrects the tint of the projection image 74 for each model of the AR glasses, the three-dimensional LUT corresponding to the model of the AR glasses 10, performs image processing for gradation transformation of each RGB color, and corrects the tint of the projection image 74 to generate a visually-recognized projected image simulated image. The visually-recognized projected image simulated image generation unit 59 outputs the generated visually-recognized projected image simulated image to the recording controller 62. In a case in which the projection image visibility controller 58 changes the brightness value of the projection image 74, the projection image visibility controller 58 outputs the projection image 74 from which the brightness value is changed to the visually-recognized projected image simulated image generation unit 59. For this reason, in a case in which the visibility of the projected image 75 is changed, the visually-recognized projected image simulated image, which is also simulated with respect to the change in visibility, is output from the visually-recognized projected image simulated image generation unit 59.

The recording controller 62 has a function of performing a control to cause the image recording unit 47 to record the visually-recognized real image simulated image generated by the visually-recognized real image simulated image generation unit 57 and the visually-recognized projected image simulated image generated by the visually-recognized projected image simulated image generation unit 59. The recording controller 62 may cause the image recording unit 47 to record the visually-recognized real image simulated image and the visually-recognized projected image simulated image in a combined state, and may cause the image recording unit 47 to record the visually-recognized real image simulated image and the visually-recognized projected image simulated image in association with each other as individual images.

Next, the action of the smartphone 12 of the present embodiment will be described. FIG. 8 shows a flowchart showing an example of the flow of image processing that is performed by the processor 40 of the smartphone 12 of the present embodiment. For example, in the smartphone 12 of the present embodiment, the processor 40 executes the image processing program 45 stored in the storage unit 44 to perform the image processing of which an example is shown in FIG. 8 in a case in which an instruction to start projection, which is input using the input device 48 by a user, is received. The user visually recognizes the real world 70, that is, the real image 72 with both the left and right eyes through the transmission unit 20L for a left eye and the transmission unit 20R for a right eye at a point of time when the image processing shown in FIG. 8 is started.

In Step S100 of FIG. 8, the projection image acquisition unit 50 starts acquisition of the projection image 74. In the present embodiment, the image data of the projection image 74 is acquired from the storage unit 44 as described above.

In the next step S102, as described above, the captured image acquisition unit 51 starts acquisition of the captured image obtained by imaging the real world 70 from the camera 27.

In the next step S104, the visibility controller 54 acquires model information indicating the model of the AR glasses 10 and model information indicating the model of the camera 27, respectively. The method in which the visibility controller 54 acquires model information indicating the model of the AR glasses 10 and model information indicating the model of the camera 27, respectively is not limited. For example, the visibility controller 54 may inquire of each of the AR glasses 10 and the camera 27 to acquire model information from each of the AR glasses 10 and the camera 27.

In the next step S106, the display controller 60 outputs the image data of the projection image 74 and a start instruction to start projection to the OLED 26 so that the projection image 74 acquired in Step S100 is projected onto the light guide plate 24. In a case in which the image data of the projection image 74 and the start instruction to start projection are input to the OLED 26 from the smartphone 12, the OLED 26 projects the input projection image 74 onto the light guide plate 24.

As a result, the user visually recognizes the projected image 75 corresponding to the projection image 74. Therefore, the user visually recognizes the real image 72 on which the projected image 75 is superimposed, and focuses the visual line on either the real image 72 or the projected image 75.

In the next step S108, the region-of-interest acquisition unit 52 starts acquiring the region-of-interest information, which indicates the region of interest, based on the detection result of the visual line detection sensor 29.

In the next step S110, the visibility controller 54 determines whether or not the region of interest is the real image 72. In a case in which the region of interest is the real image 72, the processing in Step S110 is an affirmative determination, and the processing proceeds to Step S112.

In Step S112, as described above, the real image visibility controller 56 determines whether or not the illuminance acquired by the illuminance acquisition unit 53 is equal to or greater than the threshold value. In a case in which the acquired illuminance is equal to or greater than the threshold value, that is, in a case in which the real world 70 is bright, the determination in Step S112 is an affirmative determination, and the processing proceeds to Step S114.

In Step S114, as described above, the real image visibility controller 56 improves the visibility of the real image 72 by darkening the brightness of the real image 72. Specifically, an instruction is output to the real image visibility change unit 28 to reduce the brightness of the real image 72 by the predetermined amount of reduction. In a case in which an instruction is input from the smartphone 12, the real image visibility change unit 28 shields the transmission unit 20R for a right eye from the light by the instructed amount of reduction. Accordingly, the user can easily see the real image 72, thereby the visibility of the real image 72 is improved.

On the other hand, in a case in which the illuminance is less than the threshold value in Step S112, that is, in a case in which the real world 70 is dark, the determination in Step S112 is a negative determination, and the processing proceeds to Step S116. In Step S116, as described above, the projection image visibility controller 58 improves the visibility of the real image 72 by darkening the brightness of the projection image 74. Specifically, by reducing the brightness value of the projection image 74 by a predetermined amount, the projection image 74 is darkened, so that the projected image 75 is darkened and the real image 72 is relatively brightened. Accordingly, the user can easily see the real image 72, thereby the visibility of the real image 72 is improved.

On the other hand, in a case in which the region of interest is not the real image 72, in other words, in a case in which the region of interest is the projected image 75, the processing in Step S110 is a negative determination, and the processing proceeds to Step S118. In Step S118, as described above, the projection image visibility controller 58 improves the visibility of the projected image 75. Specifically, by increasing the brightness value of the projection image 74 by a predetermined amount, the projection image 74 is brightened to make the projected image 75 relatively brighter than the real image 72. Accordingly, the user can easily see the projected image 75, thereby the visibility of the projected image 75 is improved.

In a case in which the processing of Step S114, S116, or S118 ends, the processing proceeds to Step S120.

In Step S120, as described above, the visually-recognized real image simulated image generation unit 57 acquires the three-dimensional LUT corresponding to each of the AR glasses model information and the camera model information.

In the next step S122, the visually-recognized real image simulated image generation unit 57 generates a visually-recognized real image simulated image from the captured image captured by the camera 27 as described above. As described above, the visually-recognized real image simulated image generation unit 57 generates the visually-recognized real image simulated image by performing image processing for the captured image using the three-dimensional LUT corresponding to the model information on the AR glasses 10 and image processing for the captured image using the three-dimensional LUT corresponding to the model information of the camera 27. In a case in which the visibility of the real image 72 is improved, image processing according to the improvement of the visibility is also performed on the captured image to generate a visually-recognized real image simulated image. For example, since the real image 72 is darkened as described above, examples of the image processing according to the improvement of the visibility include image processing in which the brightness value of the captured image is reduced according to the light shielding rate of the real image visibility change unit 28. The model information on the AR glasses 10 of the present embodiment is an example of model information on the glasses-type information display device according to the embodiment of the present disclosure.

In the next step S124, as described above, the visually-recognized projected image simulated image generation unit 59 generates the visually-recognized projected image simulated image from the projection image 74 output from the projection image visibility controller 58. As described above, the visually-recognized projected image simulated image generation unit 59 generates the visually-recognized projected image simulated image by performing image processing for the projection image 74 output from the projection image visibility controller 58 using the three-dimensional LUT corresponding to the model information of the AR glasses 10.

In the next step S126, the recording controller 62 performs a control to cause the image recording unit 47 to record the visually-recognized real image simulated image generated in Step S122 and the visually-recognized projected image simulated image generated in Step S124 in association with each other.

In the next step S128, the region-of-interest acquisition unit 52 determines whether or not the region of interest is changed. In a case in which the region of interest is changed, the determination in Step S128 is an affirmative determination, and the processing proceeds to Step S130. In Step S130, the visibility controller 54 resets the change in visibility of the real image 72 or the projected image 75 that is currently being performed. That is, the visibility of the real image 72 and the projected image 75 is not changed. After Step S130, the processing returns to Step S110 and the processing of Steps S110 to S128 is repeated. On the other hand, in a case in which the region of interest is not changed, the determination in Step S128 is a negative determination, and the processing proceeds to Step S132.

In Step S132, the display controller 60 determines whether or not to end projection of the projection image 74. As an example, in the present embodiment, in a case in which an instruction to end projection, which is input using the input device 48 by the user, is received, the projection of the projection image 74 ends. Accordingly, in a case in which an instruction to end the projection of the projection image 74 is not received, the determination in Step S132 is a negative determination, and the processing returns to Step S128. On the other hand, in a case in which an instruction to end the projection of the projection image 74 is received, the determination in Step S132 is an affirmative determination, and the processing proceeds to step S134.

In Step S134, the visibility controller 54 determines whether or not the visibility of the real image 72 is being changed by the real image visibility change unit 28. In a case in which the visibility of the real image 72 is not being changed, the determination in Step S134 is a negative determination, and the processing proceeds to Step S138. On the other hand, in a case in which the visibility of the real image 72 is being changed, the determination in Step S134 is an affirmative determination, and the processing proceeds to Step S136.

In Step S136, the real image visibility controller 56 of the visibility controller 54 outputs an end instruction to the real image visibility change unit 28 so that the change in the visibility of the real image 72 ends. In a case in which the end instruction is input to the real image visibility change unit 28 from the smartphone 12, the real image visibility change unit 28 ends the shielding of the transmission unit 20R for a right eye from light. This returns to the state before the visibility of the real image 72 is changed.

In the next step S138, the display controller 60 outputs an end instruction to the OLED 26 so that the projection of the projection image 74 ends. In a case in which the end instruction is input to the OLED 26 from the smartphone 12, the OLED 26 ends the projection of the projection image. In a case in which the processing of Step S138 ends, the image processing shown in FIG. 8 ends.

In this way, according to the smartphone 12, in a case in which the visibility of the real image 72 and the projected image 75 is changed, the visually-recognized real image simulated image and the visually-recognized projected image simulated image in accordance with the change in the visibility are recorded in the image recording unit 47. Therefore, by observing the visually-recognized real image simulated image and the visually-recognized projected image simulated image recorded in the image recording unit 47, the observer can observe the image equivalent to the real image 72 and the projected image 75 visually recognized by the user of the glasses-type information display device 1.

In addition, an aspect in which the visibility of the real image 72 and the projected image 75 is changed according to the region of interest of the user has been described in the above-mentioned embodiment. However, the method of changing the visibility of the real image 72 and the projected image 75 is not limited to the present embodiment. For example, in a case in which it is determined which of the real image 72 and the projected image 75 to emphasize to the user, the visibility of the image to be emphasized may be changed to be higher than the visibility of the image not to be emphasized.

In addition, the method for detecting the region of interest is not limited to the above-mentioned embodiment. For example, the smartphone 12 may receive the region of interest that is designated by the user. In addition, for example, the smartphone 12 may estimate the user's interest from the Internet browsing history and the smartphone 12 may estimate the region of interest based on the estimated interest.

In addition, an aspect in which the AR glasses 10 is applied as an example of the glasses-type information display device according to the embodiment of the present disclosure in the above-mentioned embodiment, but the glasses-type information display device is not limited to the AR glasses 10, and can be applied to various forms such as a head-mounted display.

In addition, the word "glasses" in the "glasses-type information display device" functionally means implementing a first sensor (human eyes) that acquires an image and a second sensor (camera 27 of AR glasses 10) that includes the visual field of the first sensor and that acquires a captured image in substantially the same visual line direction as the first sensor. A shape of the glasses-type information display device is not limited to a general shape of glasses, an application, or a wearing portion. In addition, the glasses-type information display device may be a monocular type or a compound eye type, and the aspect in which the projected image is visually recognized with one eye has been described in the above-mentioned embodiment, but the projected image may be visually recognized with both eyes. A shape in which the left and right sides are connected like goggles may be used. In addition, it is not limited to devices wearing on a human head, like a so-called head-mounted display (for example, if a robot with the appearance of a dog simulates a function of a human, and the function of human eyes is achieved by a camera in the robot's knee, then the image processing device according to the embodiment of the present disclosure is mounted on the knee). Such an image processing device is also included in the technique of the present disclosure.

In addition, an aspect in which the AR glasses 10 comprises one camera 27 and one camera 27 captures the entire visual field of the user has been described in the above-mentioned embodiment. However, the camera comprised in the AR glasses 10 is not limited to this aspect. For example, an aspect comprising two cameras, a camera that images the real world 70 corresponding to the visual field of the right eye of the user and a camera that images the real world 70 corresponding to the visual field of the left eye of the user, may be used.

In addition, a case in which the projection image 74 is a still image has been described in the above-mentioned embodiment, but the projection image 74 may be a video.

In addition, a device other than the glasses-type information display device 1 may comprise some or all of the functions of the smartphone 12 of the above-mentioned embodiment. For example, the smartphone 12 may have a function of projecting the projection image 74 onto the light guide plate 24, and another device may have a function of the image processing device of the present disclosure.

In addition, in the above-mentioned embodiment, information corresponding to the types of the lens 22R for a right eye and the light guide plate 24 is exemplified as model information indicating the model of the AR glasses 10, but the model information indicating the model of the AR glasses 10 is not limited to these. For example, the information may correspond to any one of the lens 22R for a right eye or the light guide plate 24, or the information corresponding to the lens 22L for a left eye may be further used. In addition, in a case in which a member that causes a change in optical characteristics is provided in addition to the light guide plate 24, information corresponding to the type of the member may be used.

In addition, the following various processors can be used in the above-mentioned embodiment as the hardware structures of processing units such as the projection image acquisition unit 50, the captured image acquisition unit 51, the region-of-interest acquisition unit 52, the illuminance acquisition unit 53, the visibility controller 54, the visually-recognized real image simulated image generation unit 57, the visually-recognized projected image simulated image generation unit 59, the display controller 60, and the recording controller 62, which perform various types of processing. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). In addition, a plurality of processing units may be formed of one processor.

As an example in which a plurality of processing units are formed of one processor, first, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

Furthermore, more specifically, electrical circuitry in which circuit elements, such as semiconductor elements, are combined can be used as the hardware structures of these various processors.

In addition, an aspect in which the image processing program 45 is stored (installed) in the storage unit 44 in advance has been described in each above-mentioned embodiment, but the present disclosure is not limited thereto. The image processing program 45 may be provided in a form where the image processing program 45 is recorded in recording mediums, such as a compact disc read only memory (CD-ROM), a digital versatile disc read only memory (DVD-ROM), and a universal serial bus (USB) memory. In addition, the image processing program 45 may be downloaded from an external device through a network.

In regard to the embodiment described above, the following supplementary notes will be further disclosed.

(Supplementary Note 1)

An image processing device comprising: at least one processor, in which in a case in which, for at least one image of a real image visually recognized by a user through a transmission unit of a glasses-type information display device or a projected image projected onto the transmission unit and visually recognized by the user, a visibility change unit that changes visibility by the user changes visibility of the real image, the processor generates an image simulating the real image after the change in visibility from a captured image obtained by imaging a real world with a camera based on at least one of information indicating the change in visibility, model information on the glasses-type information display device, or model information on the camera.

(Supplementary Note 2)

The image processing device according to Supplementary Note 1, in which the processor performs a control to record the image simulating the real image after the change in visibility.

(Supplementary Note 3)

The image processing device according to Supplementary Note 1 or 2, in which in a case in which the visibility change unit changes visibility of the projected image, the processor generates an image simulating the projected image after the change in visibility from a projection image projected onto the transmission unit based on the information indicating the change in visibility and the model information on the glasses-type information display device, and performs a control to record the image simulating the projected image after the change in visibility.

(Supplementary Note 4)

The image processing device according to any one of Supplementary Notes 1 to 3, in which the model information on the glasses-type information display device is information corresponding to a type of the transmission unit.

(Supplementary Note 5)

The image processing device according to any one of Supplementary Notes 1 to 4, in which the transmission unit includes a light guide plate that propagates light representing the projection image and emits the light in a direction of a user's eye, and the model information on the glasses-type information display device is information corresponding to a type of the light guide plate.

(Supplementary Note 6)

A glasses-type information display device comprising a transmission unit, a visibility change unit, and the image processing device according to any one of Supplementary Notes 1 to 5.

(Supplementary Note 7)

An image processing method comprising generating, in a case in which, for at least one image of a real image visually recognized by a user through a transmission unit of a glasses-type information display device or a projected image projected onto the transmission unit and visually recognized by the user, a visibility change unit that changes visibility by the user changes visibility of the real image, an image simulating the real image after the change in visibility from a captured image obtained by imaging a real world with a camera based on at least one of information indicating the change in visibility, model information on the glasses-type information display device, or model information on the camera.

(Supplementary Note 8)

An image processing program for causing a processor to execute a process comprising generating, in a case in which, for at least one image of a real image visually recognized by a user through a transmission unit of a glasses-type information display device or a projected image projected onto the transmission unit and visually recognized by the user, a visibility change unit that changes visibility by the user changes visibility of the real image, an image simulating the real image after the change in visibility from a captured image obtained by imaging a real world with a camera based on at least one of information indicating the change in visibility, model information on the glasses-type information display device, or model information on the camera.

What is claimed is:

1. An image processing device for a glasses-type information display device including a transmission unit that is configured to transmit a real light from a real world visually recognized by the user, and to project a projected light visually recognized by the user, a visibility change unit that is configured to change visibility by the user for at least one of the real light or the projected light,
the image processing device comprising:
at least one processor,
wherein, in response to the visibility change unit changing visibility of the real light, the processor generates a simulated image data simulating the real light visually recognized by the user after the visibility change unit changes the visibility of the real light from a captured image data obtained by imaging a real world with a camera, based on at least one of information indicating a change in visibility, model information on the glasses-type information display device, or model information on the camera; and
wherein the processor performs a control to record the image simulating the real image after the change in visibility.

2. The image processing device according to claim 1,
wherein, in response to the visibility change unit changing visibility of the
projected image,
the processor generates an image simulating the projected image after the change in visibility from a projection image projected onto the transmission unit based on the information indicating the change in visibility and the model information on the glasses-type information display device, and
performs a control to record the image simulating the projected image after the change in visibility.

3. The image processing device according to claim 2,
wherein the model information on the glasses-type information display device is information corresponding to a type of the transmission unit.

4. The image processing device according to claim 3,
wherein the transmission unit includes a light guide plate that propagates light representing the projection image and emits the light in a direction of a user's eye, and the model information on the glasses-type information display device is information corresponding to a type of the light guide plate.

5. A glasses-type information display device comprising:
a transmission unit;
a visibility change unit; and
the image processing device according to claim 1.

6. A glasses-type information display device comprising:
a transmission unit;
a visibility change unit; and
the image processing device according to claim 1.

7. A glasses-type information display device comprising:
a transmission unit;
a visibility change unit; and
the image processing device according to claim 2.

8. A glasses-type information display device comprising:
a transmission unit;
a visibility change unit; and
the image processing device according to claim 3.

9. A glasses-type information display device comprising:
a transmission unit;
a visibility change unit; and
the image processing device according to claim 4.

10. An image processing method for a glasses-type information display device including a transmission unit that is configured to transmit the real light from a real world visually recognized by the user, and to project a projected light visually recognized by the user, and a visibility change unit that is configured to change visibility by the user for at least one of the real light or the projected light, the method comprising:
in response to the visibility change unit changing visibility of the real light, generating a simulated image data simulating a real light visually recognized by the user after the visibility change unit changes the visibility of the real light from a captured image data, the captured image data obtained by imaging a real world with a camera based on at least one of information indicating the change in visibility, model information on a glasses-type information display device, or model information on the camera;
wherein the processor performs a control to record the image simulating the real image after the change in visibility.

11. A non-transitory computer-readable storage medium storing an image processing program for causing a processor to execute a process comprising:
in response to the visibility change unit changing visibility of the real light, the visibility change unit being included in a glasses-type information display device including a transmission unit that is configured to transmit the real light from a real world visually recognized by the user, and to project a projected light visually recognized by the user, and the visibility change unit that is configured to change visibility by the user for at least one of the real light or the projected light, generating a simulated image data simulating a real light visually recognized by the user after the visibility change unit changes the visibility of the real light from a captured image data, the captured image data obtained by imaging a real world with a camera, based on at least one of information indicating the change in visibility, model information on the glasses-type information display device, or model information on the camera; and recording the image simulating the real image after the change in visibility.

\* \* \* \* \*